(12) United States Patent
Cousino et al.

(10) Patent No.: US 11,952,506 B2
(45) Date of Patent: Apr. 9, 2024

(54) COATINGS WITH EARLY WATER RESISTANCE

(71) Applicant: MOMENTIVE PERFORMANCE MATERIALS INC., Waterford, NY (US)

(72) Inventors: Paula Reneé Cousino, Nyack, NY (US); Michael James Seeber, Highlands, NJ (US)

(73) Assignee: MOMENTIVE PERFORMANCE MATERIALS INC., Waterford, NY (US)

(*) Notice: Subject to any disclaimer, the term of this patent is extended or adjusted under 35 U.S.C. 154(b) by 332 days.

(21) Appl. No.: 17/288,608

(22) PCT Filed: Nov. 1, 2019

(86) PCT No.: PCT/US2019/059380
§ 371 (c)(1),
(2) Date: Apr. 26, 2021

(87) PCT Pub. No.: WO2020/092895
PCT Pub. Date: May 7, 2020

(65) Prior Publication Data
US 2021/0395534 A1 Dec. 23, 2021

Related U.S. Application Data

(60) Provisional application No. 62/754,725, filed on Nov. 2, 2018.

(51) Int. Cl.
| | | |
|---|---|---|
| *C08L 83/06* | (2006.01) | |
| *C08G 77/14* | (2006.01) | |
| *C09D 5/02* | (2006.01) | |
| *C09D 133/12* | (2006.01) | |

(52) U.S. Cl.
CPC ............. *C09D 5/022* (2013.01); *C08G 77/14* (2013.01); *C09D 5/024* (2013.01); *C09D 133/12* (2013.01)

(58) Field of Classification Search
CPC ...... C09D 5/022; C09D 5/024; C09D 133/12; C09D 133/02; C08G 77/14; C08G 77/04; C08K 2003/2241; C08K 3/36; C08K 3/22; C08L 83/06
USPC ....................................................... 523/400
See application file for complete search history.

(56) References Cited

U.S. PATENT DOCUMENTS

| | | | |
|---|---|---|---|
| 7,371,463 B2 | 5/2008 | Koehler et al. | |
| 7,732,552 B2 | 6/2010 | Lejeune et al. | |
| 7,893,183 B2 | 2/2011 | Lejeune et al. | |
| 2003/0171497 A1* | 9/2003 | Coca ................... | C08G 18/798 |
| | | | 427/500 |
| 2006/0225613 A1 | 10/2006 | Lejeune et al. | |
| 2011/0184088 A1* | 7/2011 | Lohmeijer ........... | C09D 133/12 |
| | | | 524/556 |
| 2012/0165428 A1* | 6/2012 | Tilara ................... | C09D 133/06 |
| | | | 523/400 |

FOREIGN PATENT DOCUMENTS

| | | |
|---|---|---|
| AU | 2014321557 | 4/2016 |
| CN | 101189281 | 5/2008 |
| CN | 104080870 | 10/2014 |
| JP | 2000512662 | 9/2000 |
| JP | 2005015645 | 1/2005 |
| JP | 2005179573 | 7/2005 |
| JP | 2006052297 | 2/2006 |
| JP | 2006117797 | 5/2006 |
| JP | 2008537747 | 9/2008 |
| JP | 2009518503 | 5/2009 |
| JP | 2013241584 | 12/2013 |
| JP | 2015510521 | 4/2015 |
| JP | 2017535529 | 11/2017 |
| WO | 2006110331 | 10/2006 |
| WO | 2013096272 | 7/2013 |
| WO | 2015041942 | 3/2015 |

OTHER PUBLICATIONS

International Search Report and Written Opinion dated Feb. 4, 2020; International Patent Application No. PCT/US2019/059380 filed Nov. 1, 2019. ISA/EP.

* cited by examiner

*Primary Examiner* — Hannah J Pak
(74) *Attorney, Agent, or Firm* — James C. Abruzzo; McDonald Hopkins LLC

(57) ABSTRACT

A coating composition is shown and described herein. The coating composition comprises: the (meth)acrylic polymer containing at least one active hydrogen (a), the epoxy silane oligomer composition (b), emulsifier (c), titanium oxide particles (d), a siliceous particulate filler (e) and water (f) optionally one or more additives, where the epoxy silane oligomer composition comprises 5 to 15 weight percent monomer, 5 to 20 weight percent dimer, 5 to 20 weight percent trimer and 45-85 weight percent poly-oligomers components. The coating composition can provide a water-based coating composition exhibiting early water resistance such that defects in the coating are minimized if exposed to water prior to the coating being fully cured.

21 Claims, 5 Drawing Sheets

(2a)

(2b)

(2c)

(3a)

(3b)

(3c)

COATINGS WITH EARLY WATER RESISTANCE

CROSS-REFERENCE TO RELATED APPLICATIONS

The present application is a 35 U.S.C. § 371 national stage application of PCT Application No. PCT/US2019/059380 filed on Nov. 1, 2019, entitled "COATINGS WITH EARLY WATER RESISTANCE," which claims priority to and the benefit of U.S. Provisional Patent Application No. 62/754,725 entitled "Coatings with Early Water Resistance" filed on Nov. 2, 2018, the disclosures of each of which are incorporated herein by reference in their entireties.

FIELD OF INVENTION

The present invention relates to a coating composition and particularly to water-based coating compositions comprising an emulsion of a (meth)acrylate polymer containing at least one functional group having an active hydrogen, an epoxy functional silane oligomer composition, titanium oxide, and a siliceous filler. These water-based coating compositions employing the epoxy functional silane oligomer composition provide a coating that exhibits early water resistance to moisture blistering that can result from exposure to moisture prior to the coating being fully cured.

BACKGROUND

Water-based coatings and paints may be exposed to water or moisture shortly after the coating is applied to a surface and before the coating has time to fully cure. The moisture exposure can occur in indoor applications, where the coating may be exposed to conditions containing a high percentage of moisture in the air such as in high humidity conditions, or from steam or humidity generated in bathrooms and showers, and outdoor applications where the coating may be exposed to moisture from environmental conditions including humidity, fog, dew, rain and snow. Exposure to moisture prior to curing of the coating may cause the coating to blister or wrinkle. Blisters or wrinkles in the coating can lead to poor adhesion of the coating and result in other defects, such as peeling.

One conventional manner to attempt to avoid these issues is to increase the curing rate of the coating. For example, additives such as 2-amino-2-methyl-1-propanol have been used to increase the curing rate of the coating. While this may avoid some issues that result from early exposure to moisture, other coating properties may end up being sacrificed, such as the flexibility of the coating and surface appearance.

Accordingly, there remains a need to provide water-based coating compositions with good resistance to the formation of blisters and wrinkles when exposed to moisture shortly after application of the coating to the substrate.

SUMMARY

In accordance with the present invention, a water-based coating composition is provided which exhibits resistance to water shortly after application to the substrate. In one aspect, the water-based coating composition comprises (a) an emulsion of a (meth)acrylic polymer containing at least one functional group having an active hydrogen, and (b) an epoxy silane oligomer composition. The addition of an epoxy silane oligomer composition to the emulsion of the (meth)acrylic polymer has been found to improve resistance to blistering and wrinkling when exposed to water shortly after application to a substrate, often referred to as early water resistance. The water-based coating composition can provide for a coating exhibiting early water resistance such that defects in the coating are minimized if exposed to water prior to the coating being fully cured.

In one aspect, a method for coating a substrate is provided comprising applying a water-based coating composition to the substrate, wherein the water-based coating composition comprises an emulsion of a (meth)acrylic polymer containing at least one functional group having an active hydrogen and an epoxy silane oligomer composition.

In one aspect, a water-based coating composition comprises:

(a) a (meth)acrylic polymer containing at least one functional group having an active hydrogen;

(b) an epoxy silane oligomer composition containing
  (i) a monomer in the amount of from about 5 to about 15 weight percent and having the structure of Formula (I):

$$(Z^c)_a(R^1O)_{3-2a}Si-R^2 \qquad (I)$$

(ii) a dimer in the amount of from about 5 to about 20 weight percent and having the structure of Formula (II):

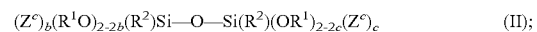

$$(Z^c)_b(R^1O)_{2-2b}(R^2)Si-O-Si(R^2)(OR^1)_{2-2c}(Z^c)_c \qquad (II);$$

(iii) at least one trimer having the linear structure (III) or cyclic structure (IV):

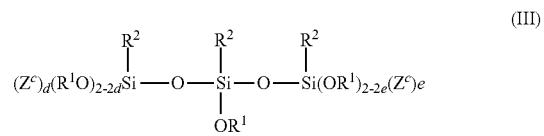

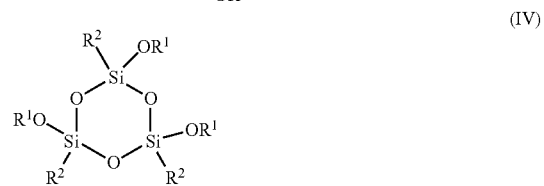

in the amount of from about 5 to about 20 weight percent, wherein the total amount of the trimer (iii) is the sum of the weights of linear trimer of Formula (III) and/or cyclic trimer of Formula (IV); and (iv) at least one poly-oligomer having the structure of Formula (V):

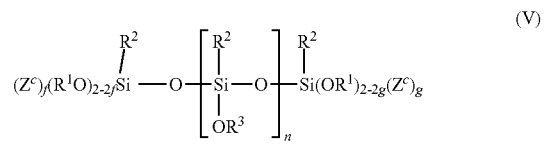

in the amount of from about 45 to about 85 weight percent, wherein the total amount of poly-oligomer (iv) is the sum of weights of each component having a structure of Formula (V), wherein
  each occurrence of $Z^c$ is independently a divalent group $-OR^4O-$, where $R^4$ is a divalent linear alkylene group of 2 to 6 carbon atoms or a branched alkylene group of 3 to 6 carbon atoms, with the provisos that
(i) the two oxygen atoms are bonded to two different carbon atoms in $R^4$ and
(ii) the open valence of each oxygen atom is bonded to the same Si atom to form a cyclic 1,3-dioxa-2-sila-cycloalkyl group;

each occurrence of $R^1$ is independently a monovalent linear alkyl group
containing from 1 to 6 carbon atoms, a branched alkyl group containing from 3 to 6 carbon atoms or a —$OR^4OH$ group where $R^4$ is independently a divalent linear alkylene group of 2 to 6 carbon atoms or a branched alkylene group of 3 to 6 carbon atoms;

each occurrence of $R^2$ is

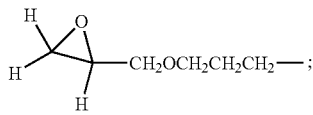

each occurrence of $R^3$ is independently a monovalent linear alkyl group
containing from 1 to 6 carbon atoms, a branched alkyl group containing from 3 to 6 carbon atoms, a —$OR^4OH$ group where $R^4$ is independently a divalent linear alkylene group of 2 to 6 carbon atoms or a branched alkylene group of 3 to 6 carbon atoms, or

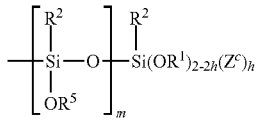

where each occurrence of $R^5$ is independently a monovalent linear alkyl group containing from 1 to 6 carbon atoms, a branched alkyl group containing from 3 to 6 carbon atoms, a —$OR^4OH$ group where $R^4$ is independently a divalent linear alkylene group of 2 to 6 carbon atoms or a branched alkylene group of 3 to 6 carbon atoms, or

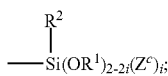

and subscripts a, b, c, d, e, f, g, h, i, m and n are integers, where a, b, c, d, e, f, g, h and i are independently 0 or 1, m is 0 to 5 and n is 2 to 15, and wherein the weight percentages are based on the total weight of the sum of components (i), (ii), (iii) and (iv);
(c) an emulsifier;
(d) titanium oxide particles;
(e) a siliceous particulate filler; and
(f) water.

In one embodiment, the epoxy silane oligomer composition (b) is present in the coating composition in an amount of from greater than about 0.5 to about 5 percent by weight, preferably about 0.75 to about 2 percent by weight, based on the weight of the (meth)acrylic polymer containing at least one functional group having an active hydrogen (a).

In one embodiment, the functional group containing an active hydrogen is a carboxyl group (—C(═O)OH) or a hydroxyl groups (—OH). In one embodiment, the functional group containing an active hydrogen is a carboxyl group that is neutralized to the salt form —C(═O)O$^-$M$^+$, where M$^+$ is Na$^+$, K$^+$, or an ammonium ion.

In one embodiment, the carboxyl group is in an amount sufficient to have an acid number, as determined by potentiometric titration methods, of from about 1 to about 780.

In one embodiment, the (meth)acrylic polymers containing at least one functional group having an active hydrogen (a) are selected from the group consisting of pure acrylics, styrene acrylics, vinyl acrylics and acrylated ethylene vinyl acetate copolymers.

In one embodiment, the (meth)acrylic polymers containing at least one functional group having an active hydrogen (a) are prepared by emulsion polymerization.

In one embodiment, the pure acrylics are prepared using acrylic acid, methacrylic acid, an acrylate ester, and/or a methacrylate ester as the monomers, the styrene acrylics are prepared using styrene and acrylic acid, methacrylic acid, an acrylate ester, and/or a methacrylate ester as the monomers, the vinyl acrylics are prepared using vinyl acetate and acrylic acid, methacrylic acid, an acrylate ester, and/or a methacrylate ester as the monomers and the acrylated ethylene vinyl acetate copolymers are prepared using ethylene, vinyl acetate and acrylic acid, methacrylic acid, an acrylate ester, and/or a methacrylate ester as the monomers.

In one embodiment, the (meth)acrylic polymer containing at least one functional group having an active hydrogen (a) is in an amount of from about 5 to about 60% by weight, based on the sum of the weights of (meth)acrylic polymer containing at least one functional group having an active hydrogen (a), the epoxy silane oligomer composition (b), the emulsifier (c), titanium oxide particles (d), the siliceous particulate filler (e) and water (f).

In one embodiment, $R^1$ is selected from the group consisting of methyl, ethyl, propyl, isopropyl, 2-hydroxyethyl, 2-methyl-3-hydroxypropyl, 3-hydroxybutyl, and 1,3-dimethyl-3-hydroxybutyl; $R^3$ is selected from the group consisting of methyl, ethyl, propyl, isopropyl, 2-hydroxyethyl, 2-methyl-3-hydroxypropyl, 3-hydroxybutyl, and 1,3-dimethyl-3-hydroxybutyl; $R^4$ is selected from the group consisting of ethylene, propylene, and 2-methyl propylene; and $R^5$ is selected from the group consisting of methyl, ethyl, propyl, isopropyl, 2-hydroxyethyl, 2-methyl-3-hydroxypropyl, 3-hydroxybutyl and 1,3-dimethyl-3-hydroxybutyl. (glycidoxypropyl)bis(2-methyl-3-hydroxypropoxy)silyl, and [(glycidoxypropyl)dimethoxysilyloxy]-(glycidoxypropyl)methoxysilyl.

In one embodiment, $R^1$ is methyl or ethyl, $R^3$ is methyl or ethyl; $R^5$ is methyl, ethyl, (glycidoxypropyl)dimethoxysilyl; or (glycidoxypropyl)diethoxysilyl); and a, b, c, d, e, f, g, h, and i are 0.

In one embodiment, the epoxy silane oligomer composition (b) has a weight average molecular weight of from about 500 to about 2500.

In one embodiment, the epoxy silane oligomer composition (b) is an amount of from greater than about 0.5 weight percent to about 5 weight percent, based on the weight of the (meth)acrylic polymer containing at least one functional group having an active hydrogen (a).

In one embodiment, the emulsifier (c) is a surfactant selected from the group consisting of polyoxyethylene alkyl ethers, polyoxyethylene alkyl phenyl ethers, polyoxyethylene fatty acid esters, sorbitan fatty acid esters, polyoxyethylene sorbitan fatty acids esters, fatty acid salts, alkyl sulfate ester salts, alkyl benzene sulfonate salts, alkyl phosphate ester salts, alkylallyl sulfate ester salts, polyoxyethylene alkylphophate ester salts, long chain alkyl trimethylammonium salts, and di(long chain alkyl)dimethyl ammonium salts.

In one embodiment, the emulsifier (c) is in an amount of from about 1.0 weight percent to about 15 weight percent, based on the weight of the (meth)acrylic polymer containing at least one functional group having an active hydrogen (a).

In one embodiment, the titanium oxide particles are present in an amount of from about 0.5 weight percent to about 50 weight percent by weight based on the sum of the weights of the (meth)acrylic polymer containing at least one functional group having an active hydrogen (a), the epoxy silane oligomer composition (b), emulsifier (c), titanium oxide particles (d), a siliceous particulate filler (e), and water (f).

In one embodiment, the siliceous particulate filler is selected from the group consisting of hydrous kaolin, mullite, pyrophyllite, kyanite, nepheline syenite, clay, sillimanite, silica, and talc.

In one embodiment, the siliceous particulate filler (e) is in the amount of from about 0.05 to about 25 weight percent by weight based on the sum of the weights of the (meth)acrylic polymer containing at least one functional group having an active hydrogen (a), the epoxy silane oligomer composition (b), emulsifier (c), titanium oxide particles (d), a siliceous particulate filler (e), and water (f).

In one embodiment, the epoxy silane oligomer composition is synthesized by the reaction of an epoxy-functional silane having the structure of Formula (I):

$$(Z^c)_a(R^1O)_{3-2a}Si-R^2 \quad (I)$$

wherein $Z^c$ is a divalent group $-OR^4O-$, where $R^4$ is a divalent linear alkylene group of 2 to 6 carbon atoms or a branched alkylene group of 3 to 6 carbon atoms, with the provisos that
(i) the two oxygen atoms are bonded to two different carbon atoms in $R^4$ and
(ii) the open valence of each oxygen atom is bonded to the same Si atom to form a cyclic 1,3-dioxa-2-sila-cycloalkyl group;

each occurrence of $R^1$ is independently a monovalent linear alkyl group containing from 1 to 6 carbon atoms, a branched alkyl group containing from 3 to 6 carbon atoms or a $-OR^4OH$ group where $R^4$ is independently a divalent linear alkylene group of 2 to 6 carbon atoms or a branched alkylene group of 3 to 6 carbon atoms; each occurrence of $R^2$ is

and the subscript a is an integer, where a is 0 or 1 with 0.5 to 1.0 mole of water per mole of epoxy-functional silane in the presence of a catalyst, wherein said water is continuously fed during the reaction.

In one embodiment, the water-based coating composition of any previous embodiment is a water-based coating composition with a 60-degree gloss between 10 and 40 gloss units (GU), and more specifically 15 to 25 gloss units (GU).

In another aspect, provided is a method for coating a substrate comprising applying the coating composition of any previous embodiment to a surface of a substrate.

In one aspect, provided is a method of coating a substrate comprising: (a) providing a pre-formed water-based stock coating composition comprising a (meth)acrylic polymer containing at least one functional group having an active hydrogen, emulsifier, titanium oxide, at least one siliceous filler, water and optional additives, (b) adding an epoxy silane oligomer composition to the pre-formed stock water-based coating composition, and (c) applying the water-based coating composition from step (b) to a substrate and evaporating the water from the water-based coating composition to form a substrate containing a dry coating with improved early water resistance.

In one embodiment of the method, the composition from (b) is heat aged prior to applying the composition to a substrate. In another embodiment of the method, the composition from (b) is heat aged for 14 days at 50° C.

The following description and the drawings disclose various illustrative aspects. Some improvements and novel aspects may be expressly identified, while others may be apparent from the description and drawings. Still other objects of the invention will in part be obvious and will, in part be apparent from the specification and the scope of the invention will be indicating the claims.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
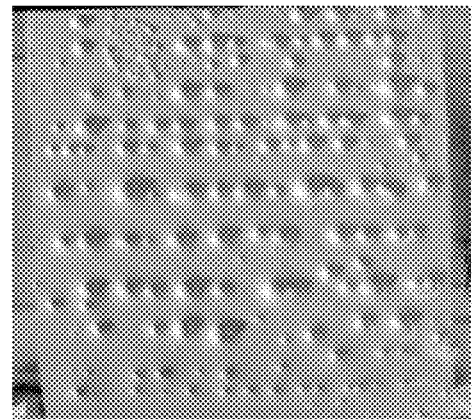
FIGS. 1a-1c are photographs of stock water-based coating composition of Comparative Example A coated substrates dried for one day (1a), four days (1b) and 7 days (1c) after coating of the substrate and then submerged in water. Severe blistering was observed after drying for one day, with some blistering observed after drying for 4 days.
Figure 1:
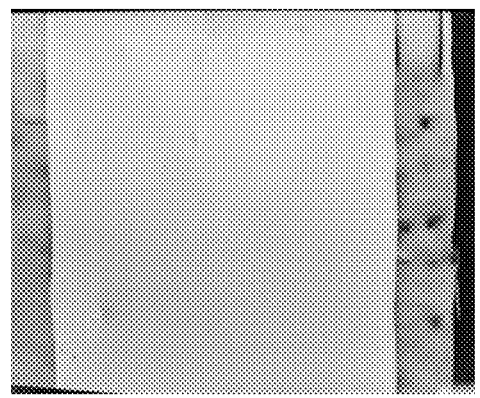
Figure 1:
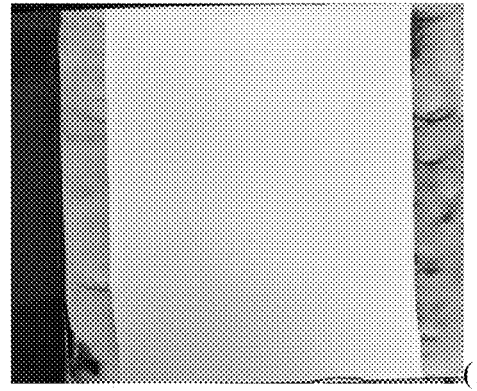

Reference will now be made to exemplary embodiments, examples of which are illustrated in the accompanying figures.

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all subranges within that range and any combination of the various endpoints of such ranges or subranges.

As used herein, integer values of stoichiometric subscripts refer to molecular species and non-integer values of stoichiometric subscripts refer to a mixture of molecular species on a molecular weight average basis, a number average basis or a mole fraction basis.

In the description that follows, all weight percentages are based upon total weight percent of the organic material(s) unless stated otherwise and all ranges given herein comprise all subranges therebetween and any combination of ranges and/or subranges therebetween.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon group" or "hydrocarbon radical" means any hydrocarbon composed of hydrogen and carbon atoms from which one or more hydrogen atoms has been removed and is inclusive of alkyl, alkenyl, alkynyl, cycloalkyl, cycloalkenyl, cycloalkynyl, aryl, aralkyl, and arenyl groups. Groups can be composed of hydrocarbon groups containing at least one heteroatom and more such as, for example, a hydrocarbon group containing at least one heteroatom of oxygen, nitrogen, or sulfur.

The term "alkyl" means any monovalent, saturated straight chain or branched chain hydrocarbon group in which one hydrogen atom has been removed; the term "alkenyl" means any monovalent straight chain or branched chain hydrocarbon group containing one or more carbon-carbon double bonds where the site of attachment of the group can be either at a carbon-carbon double bond or elsewhere therein; and, the term "alkynyl" means any monovalent straight chain or branched chain hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyl groups include methyl, ethyl, propyl and isobutyl. Examples of alkenyls include, but are not limited to, vinyl, propenyl, allyl, methallyl, ethylidenyl norbomane, ethylidene norbomyl, ethylidenyl norbomene, and ethylidene norbomenyl. Examples of alkynyls include acetylenyl, propargyl and methylacetylenyl.

The term "alkylene" means any divalent, saturated straight chain or branched chain hydrocarbon group in which two hydrogen atoms have been removed. Examples of alkylene groups include, but are not limited to, methylene ($-CH_2-$), ethylene ($-CH_2CH_2-$), propylene ($-CH_2CH_2CH_2-$), and 2-methylpropylene ($-CH_2CH(CH_3)CH_2-$). It is to be understood that in naming a compound, it is common nomenclature usage to use the name for the divalent alkyl group, which is an alkyl group where one addition hydrogen has been removed, in the name, such as 3-glycidoxypropyltrimethoxysilane, where propyl is a divalent alkyl group and equivalent to propylene.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, "water-based" means a coating that contains liquid water and can be used interchangeable with "waterborne".

Provided is a water-based coating composition comprising a (meth)acrylic polymer containing at least one functional group having an active hydrogen group, an epoxy silane oligomer composition, an emulsifier, titanium oxide, a siliceous particulate filler, water, and optionally other components. The present water-based coating compositions exhibit early moisture resistance. In particular, the water-based coating compositions exhibit a reduction in the size and/or frequency of defects, including blisters, fish eyes, and/or peeling compared to a composition that does not contain the epoxy modified silane oligomer composition.

An emulsion of a (meth)acrylic polymer containing at least one functional group having an active hydrogen in combination with other ingredients is often referred to as a latex coating or latex paint. Latex paints are used for a variety of applications including interior and exterior applications. Latex paints can be provided as a flat, semi-gloss, gloss, or satin finish depending on the need in certain applications. Latex is a dispersion of rubber or plastic polymer microparticles in an aqueous medium, in which microparticles are stabilized using emulsifiers. Latexes may be natural or synthetic.

(Meth)Acrylic Polymer Containing at Least One Functional Group Having an Active Hydrogen (a)

The (meth)acrylic polymers of the present invention have at least one functional group having an active hydrogen, including, but not limited to, carboxyl groups (—C(=O)OH), some of which may be in their neutralized salt form, such as for example, —C(=O)O$^-$M$^+$, where M$^+$ is Na$^+$, K$^+$ or ammonium ion, or hydroxyl groups (—OH). The polymers are those which contain terminal or pendant carboxyl groups and/or hydroxyl groups. In particular, the polymer contains a carboxyl acid group in an amount sufficient to have an acid number, as determined by potentiometric titration methods, between 1 and 780, and preferably, between 10 and 280. A potentiometric titration method is presented in: Wang, C., Tam, K. C., Jenkins, R. D., & Bassett, D. R. (2000). Potentiometric titration and dynamic light scattering of hydrophobically modified alkali soluble emulsion (HASE) polymer solutions, Physical Chemistry Chemical Physics, 2(9), 1967-1972, May 2000. doi: 10.1039/A910302N, incorporated herein in its entirety. When the active hydrogen-containing group is hydroxyl, the amount of the hydroxyl group is determined using ASTM D4274-05, Standard Test Methods for Testing Polyurethane Raw Materials: Determination of Hydroxyl Numbers of Polyols, incorporated herein in its entirely. When the hydroxyl group is present, the number is in the range of 1 to 25, more specifically 5 to 15.

The (meth)acrylic polymer containing at least one functional group having an active hydrogen has weight average molecular weights in the range of 1000 to $1 \times 10^8$ grams/mole. A gel permeation chromatographic method is used to determine the weight average molecular weights. In one embodiment, ASTM D5296-11 Standard Test Method for Molecular Weight Averages and Molecular Weight Distribution of Polystyrene by High Performance Size-Exclusion Chromatography, incorporated herein in its entirely, may be used The (meth)acrylic polymer containing at least one functional group having an active hydrogen (a) can be prepared by emulsion polymerization methods. Emulsion polymerization involves polymerization of (meth)acrylic monomers in the presence of emulsifiers and water. A description of the emulsion polymerization can be found in: Emulsion Polymerization, D. Distler, Encyclopedia of Materials: Science and Technology (second edition), 2769-2774 (2001), incorporated herein in its entirety.

The (meth)acrylic polymers containing at least one functional group having an active hydrogen (a) is typically selected from pure acrylics, styrene acrylics, vinyl acrylics and acrylate ethylene vinyl acetate copolymers.

The pure acrylics are prepared using acrylic acid, methacrylic acid, an acrylate ester, and/or a methacrylate ester as the monomers. The styrene acrylics are prepared using styrene and acrylic acid, methacrylic acid, an acrylate ester, and/or a methacrylate ester as the monomers. The vinyl acrylics are prepared using vinyl acetate and acrylic acid, methacrylic acid, an acrylate ester, and/or a methacrylate ester as the monomers. The acrylated ethylene vinyl acetate copolymers are prepared using ethylene, vinyl acetate and acrylic acid, methacrylic acid, an acrylate ester, and/or a methacrylate ester as the monomers. The monomers can also include other monomers such as acrylamide and acrylonitrile, and one or more functional monomers such as itaconic acid and ureido methacrylate, as would be readily understood by those skilled in the art.

The carboxyl content on the (meth)acrylic polymers containing at least one functional group having an active hydrogen (a) is often incorporated into the polymer using acrylic acid or methacrylic acid monomer during the emulsion polymerization process. The carboxy content of the (meth)acrylic polymers containing at least one functional group having an active hydrogen (a) can also be formed in-situ by hydrolysis of the ester functional groups of the (meth)acrylic polymers containing at least one functional group having an active hydrogen (a) during the emulsion polymerization reaction.

The (meth)acrylic polymers containing at least one functional group having an active hydrogen (a) of the present invention may be added to the water-based coating composition as an emulsion, which contains the (meth)acrylic polymers containing at least one functional group having an active hydrogen (a), an emulsifier (c), water (f) and other optional components. The amounts of water (e) and emulsifier (c) may make up part or all of the emulsifier and water (f) of the water-based coating composition.

Emulsions of the (meth)acrylic polymers containing at least one functional group having an active hydrogen (a) are commercially available. Representative and non-limiting examples of emulsions of (meth)acrylic polymers containing at least one functional group having an active hydrogen (a) include Joncryl® 60 polyacrylic resin and Joncryl® 67 polyacrylic resin, commercially available from BASF in Florham Park, New Jersey, and Acronal® PLUS 4670 acrylic resin and Acronal® PLUS 4130 acrylic latex resin, commercially available from BASF in Florham Park, New Jersey.

The selection of the (meth)acrylic polymers containing at least one functional group having an active hydrogen (a) is used to determine the finish of the coating. In an embodiment, the (meth)acrylic polymers containing at least one functional group having a functional group having an active hydrogen (a) is "fully acrylic" or a pure acrylic with a limited amount of or no styrenic polymer. In one embodiment, the (meth)acrylic polymers containing at least one functional group having an active hydrogen (a) is chosen primarily from a butyl acrylate/methyl methacrylate copolymer derived from monomers including butyl acrylate and methyl methacrylate.

In typical acrylic paint compositions, the (meth)acrylic polymers containing at least one functional group having an active hydrogen (a) is comprised of one or more esters of acrylic or methacrylic acid, typically a mixture of about 50:50 by weight, of a high Tg monomer derived from methyl methacrylate and a low Tg monomer such as butyl acrylate, with small proportions of about 0.5 percent to about 2 percent by weight, of acrylic or methacrylic acid. The vinyl-acrylic paints usually include vinyl acetate and butyl acrylate and/or 2-ethyl hexyl acrylate. In vinyl-acrylic paint compositions, at least about 50 percent of the polymer formed is comprised of vinyl acetate, with the remainder being selected from the esters of acrylic or methacrylic acid.

The styrene/acrylic polymers are typically similar to the acrylic polymers, with styrene substituted for all or a portion of the methacrylate monomer thereof.

The emulsion of the (meth)acrylic polymers containing at least one functional group having an active hydrogen (a) includes from about 30 to about 75% solids and a mean emulsion particle size of from about 70 to about 650 nm.

The (meth)acrylic polymers containing at least one functional group having an active hydrogen (a) is preferably present in the aqueous coating composition in an amount from about 5 to about 60% by weight, from about 8 to about 40% by weight, or about 15 to about 30% by weight, based on the sum of the weights of (meth)acrylic polymer containing at least one functional group having an active hydrogen (a) (dry weight), the epoxy silane oligomer composition (b), emulsifier (c), titanium oxide particles (d), a siliceous particulate filler (e) and water (f).

Epoxy Silane Oligomer Composition (b)

The epoxy silane oligomer composition (b) is a mixture of components containing an epoxy-functional group and a silicon atom. The epoxy silane oligomer composition is composed of:

(i) a monomer in the amount of from about 5 to about 15 weight percent and having the structure of Formula (I):

$(Z^c)_a(R^1O)_{3-2a}Si-R^2$     (I)

(ii) a dimer in the amount of from about 5 to about 20 weight percent and having the structure of Formula (II):

$(Z^c)_b(R^1O)_{2-2b}(R^2)Si-O-Si(R^2)(OR^1)_{2-2c}(Z^c)_c$     (II);

(iii) at least one trimer having the linear structure (III) or cyclic structure (IV):

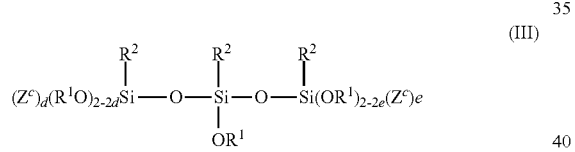

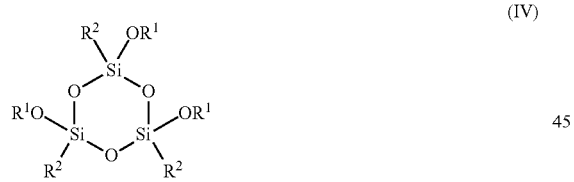

in the amount of from about 5 to about 20 weight percent, wherein the total amount of the trimer (iii) is the sum of the weights of linear trimer of Formula (III) and/or cyclic trimer of Formula (IV); and (iv) at least one poly-oligomer having the structure of Formula (V):

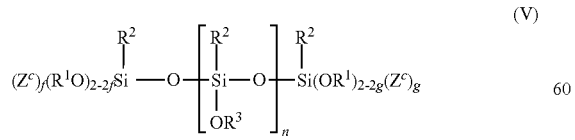

in the amount of from about 45 to about 85 weight percent, wherein the total amount of poly-oligomer (iv) is the sum of weights of each component having a structure of Formula (V), wherein
each occurrence of $Z^c$ is independently a divalent group —$OR^4O$—, where $R^4$ is a divalent linear alkylene group of 2 to 6 carbon atoms or a branched alkylene group of 3 to 6 carbon atoms, with the provisos that
(i) the two oxygen atoms are bonded to two different carbon atoms in $R^4$ and
(ii) the open valence of each oxygen atom is bonded to the same Si atom to form a cyclic 1,3-dioxa-2-silacycloalkyl group;

each occurrence of $R^1$ is independently a monovalent linear alkyl group
containing from 1 to 6 carbon atoms, a branched alkyl group containing from 3 to 6 carbon atoms or a —$OR^4OH$ group where $R^4$ is independently a divalent linear alkylene group of 2 to 6 carbon atoms or a branched alkylene group of 3 to 6 carbon atoms;

each occurrence of $R^2$ is

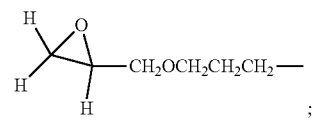

each occurrence of $R^3$ is independently a monovalent linear alkyl group
containing from 1 to 6 carbon atoms, a branched alkyl group containing from 3 to 6 carbon atoms, a —$OR^4OH$ group where $R^4$ is independently a divalent linear alkylene group of 2 to 6 carbon atoms or a branched alkylene group of 3 to 6 carbon atoms, or

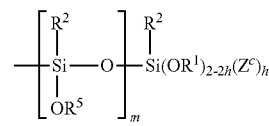

where each occurrence of $R^5$ is independently a monovalent linear alkyl group containing from 1 to 6 carbon atoms, a branched alkyl group containing from 3 to 6 carbon atoms, a —$OR^4OH$ group where $R^4$ is independently a divalent linear alkylene group of 2 to 6 carbon atoms or a branched alkylene group of 3 to 6 carbon atoms, or

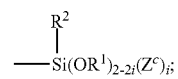

and subscripts a, b, c, d, e, f, g, h, i, m and n are integers, where a, b, c, d, e, f, g, h and i are independently 0 or 1, m is 0 to 5 and n is 2 to 15, and where the weight percentages are based on the total weight of the sum of components (i), (ii), (iii) and (iv).

Representative and non-limiting examples of $R^1$ include methyl, ethyl, propyl, isopropyl, 2-hydroxy ethyl, 2-methyl-3-hydroxypropyl, 3-hydroxybutyl, and 1,3-dimethyl-3-hydroxy butyl.

Representative and non-limiting examples of $R^3$ include methyl, ethyl, propyl, isopropyl, 2-hydroxy ethyl, 2-methyl-3-hydroxypropyl, 3-hydroxybutyl, and 1,3-dimethyl-3-hydroxy butyl.

Representative and non-limiting examples of $R^4$ include ethylene, propylene, and 2-methyl propylene.

Representative and non-limiting examples of $R^5$ include methyl, ethyl, propyl, isopropyl, 2-hydroxyethyl, 2-methyl-3-hydroxypropyl, 3-hydroxybutyl and 1,3-dimethyl-3-hydroxybutyl, (glycidoxypropyl)bis(2-methyl-3-hydroxypropoxy)silyl, and [(glycidoxypropyl)dimethoxysilyloxy]-(glycidoxypropyl)methoxysilyl.

In one embodiment, the epoxy silane oligomer composition is composed on components in which $R^1$ is methyl or ethyl, $R^3$ is methyl or ethyl, $R^5$ is methyl, ethyl, (glycidoxypropyl)dimethoxysilyl or (glycidoxypropyl)diethoxysilyl), and a, b, c, d, e, f, g, h, and i are 0.

In one embodiment, the epoxy silane oligomer composition is synthesized from the reaction of glycidoxy silane having 3 hydrolyzable groups, with water in the presence of a catalyst, wherein said water is continuously fed during the reaction. The epoxy silane oligomer may be synthesized using controlled hydrolysis and condensation of an epoxy silane monomer with continuous water introduction and a catalyst.

The catalyst can be selected from any suitable catalyst including, but not limited to, strong cationic exchange resin materials or acid catalysts such as acetic acid, sulfuric acid, and the like.

Representative and non-limiting examples of the catalyst that may be used to prepare the epoxy silane oligomer composition can be an ion exchange resin such as Purolite® CT-175 or CT 275 available from Plurolite, Amberlite® IRA 400, 402, 904, 910 or 966 available from Sigma-Aldrich, Lewatit® M-500, M-504, M-600, M-500-A, M-500 or K-2641, available from Bayer, Dowex® SBR, SBR-P, SAR, MSA-1 or MSA 2, available from Dow, or DIAON® SA10, SA12, SA 20A, PA-302, PA-312, PA-412 or PA-308, available from Mitsubishi. The catalyst can also be an alkylammonium salt such as hexadecyltrimethylammonium chloride, tetra-n-butylammonium chloride, or benzyl trimethyl ammonium chloride or bromide or the hydroxide form of these alkylammonium salts either alone or in combination with the halide salts. Other useful catalysts are the reaction products of quaternary ammonium organofunctional silanes and supports such as ceramic (inclusive of glass), silica gel, precipitated or fumed silica, alumina and aluminosilicate.

Examples of suitable glycidoxy silanes include, but are not limited to, 3-glycidoxypropyltrimethoxysilane, 3-glycidoxypropyltriethoxysilane, 3-glycidoxypropyltriproxysilane, 3-glycidoxypropyl-tris-(2-methyl-3-hydroxypropoxy)silane, 3-glycidoxypropyl-tris-(3-hydroxybutoxy)silane, 2-(3-trimethoxysilylpropyl)-2-(3-hydroxypropoxy)-[1,3,2]-dioxasilinane, and 2-(3-trimethoxysilylpropyl)-2-(2-methyl-3-hydroxypropoxy)-5-methyl-[1,3,2]-dioxasilinane.

The molar ratio of water to silane monomer(s) may be from about 0.5:1.0 to about 1.0:1.0, or from about 0.65:1.0 to about 0.85:1.0.

The epoxy silane oligomer (ESO) may be synthesized in the presence of an alcohol-free, chemically stable solvent, e.g., an aliphatic hydrocarbon, a paraffin such as naphtha or mineral spirits, an aromatic hydrocarbon such as toluene, xylene, or higher boiling homolog thereof; a ketone such as acetone, methyl ethyl ketone, methyl iso-butyl ketone, amyl ketone, an ester such as ethyl, n-propyl, n-butyl, or amyl acetate, and the like.

In another embodiment of the present invention, by-product alcohol is continuously removed during the reaction.

The amounts of each of the components of the epoxy silane oligomer composition can be determined using reverse-phase high pressure liquid chromatography (HPLC) method. The experimental conditions which may be used are an Affinity 2620 ELS detector, 60° C. with 1.60 SLPM $N_2$ conditions, LUNA C18 end cap, 5 micron, 300×4.6 mm column, a gradient of solvents

| Time (min.) | % Methanol | % Isopropanol | % Water |
|---|---|---|---|
| 0.0 | 80 | 0 | 20 |
| 6.0 | 100 | 0 | 0 |
| 12.0 | 0 | 100 | 0 |
| 13.0 | 0 | 100 | 0 |
| 13.1 | 80 | 0 | 20 |
| 20.0 | 80 | 0 | 20 | at a flow rate of 0.5 mL/minutes and an injection volume of 0.5 microliters of the solution containing 0.1 grams of the epoxy silane oligomer concentration in 4 mL of isopropanol. The individual components that eluted from the reverse-phase high pressure liquid chromatographic analysis can be isolated and further analyzed by mass spectroscopy and Nuclear Magnetic Resonance (NMR) techniques.

The epoxy silane oligomer composition can also be analyzed using $^{29}$Si NMR techniques using 0.05M chromium acetoacetone ($Cr(AcAc)_3$ in $DCCl_3$ relaxation agent.

The number average molecular weight and weight average molecular weight of the epoxy silane oligomer composition can be determined by Gel Phase Chromatographic methods (GPC). The method includes using an Agilent 2600 Infinity Chromatograph equipped with an Agilent 2600 Infinity PDA UV and Agilent 2600 Infinity ELS Detectors, and data collection on an Agilent OpenLab System. The columns were manufactured by Phenomenex Spherogel Linear (2) and were a 100×4.6 mm guard column and 300×7.6 mm, linear mixed bed columns with a reported molecular weight range of 100-20,000,000 (polystyrene). The columns were packed with 5-micron particle size, styrenedivinylbenzene and have 0.2 micron inlet frits and 0.5 micron outlet frits. The solvent was methylene chloride at a flow rate: 1.0 mL/minutes. The injection volume was 1 microliter of a 1.0 to 1.5 weight percent solution of the epoxy silane oligomer composition which had been filtered through 0.45 micron disposable filters to remove undissolved particulate matter. Narrow Mw Polydimethylsiloxane (12 range 230 to 1,250,000) were used to calibrate the system.

In one embodiment, the weight average molecular weight of the epoxy silane oligomer composition is from about 500 to about 2500 and more specifically from about 800 to about 1600, and even more specifically, from about 1100 to about 1500.

The epoxy silane oligomer composition may be present in an amount of from greater than 0.5 weight percent to about 5 weight percent, more specifically from about 0.75 weight percent to about 3 weight percent, or even more specifically, from about 1.0 weight percent to about 2.0 weight percent, based on the weight of the (meth)acrylic polymer containing at least one functional group having an active hydrogen (a).

The epoxy silane oligomer composition can be provided to the coating composition during formation of the emulsion of the (meth)acrylic polymer containing at least one functional group having an active hydrogen (a), during the mixing steps of forming the water-based coating composition or it can be added as a "post add" material to stock water-based coating composition containing the (meth) acrylic polymer containing at least one functional group having an active hydrogen (a), emulsifier (c), titanium oxide (d), siliceous particulate filler (e), water (f), and optional other ingredients. In embodiments, the epoxy silane oligomer is added to the stock water-based coating composition as a "post add" material prior to application of the water-based coating composition to a substrate. In one embodiment, a stock water-based coating composition comprising components (a), (c), (d), (e), (f), and other optional components is provided, and the epoxy silane oligomer composition (b) is added to and mixed in with the stock water-based coating composition to provide the water-based coating composition of the present invention.

Emulsifier (c)

The emulsifier (c) is used in the formation of the emulsion of the (meth)acrylic polymer containing at least one functional group having an active hydrogen (a). The emulsifier (c) stabilizes the (meth)acrylic polymer containing at least one functional group having an active hydrogen (a) in the water (f). The emulsifier (c) also functions to stabilize the epoxy silane oligomer composition in the water (f) phase of the water-based coating composition.

The emulsifiers (c) used herein include nonionic, anionic and cationic surfactants or mixture of surfactants. The mixtures include mixtures of at least one nonionic surfactant or a mixture of a nonionic surfactant with at least one anionic surfactant or at least one cationic surfactant.

Representative and non-limiting examples of nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Representative and non-limiting examples of anionic surfactants include fatty acid salts, alkyl sulfate ester salts, alkyl benzene sulfonate salts, alkyl phosphate salts, alkylallyl sulfate ester salts, and polyoxyethylene alkylphophate ester salts. Representative and non-limiting cationic surfactants include quaternary ammonium salts, such as long chain alkyl trimethylammonium salts, and di(long chain alkyl)dimethyl ammonium salts.

A further listing of surfactants useful in the present invention may be those described in 1994 McCutcheon's Vol. 2: *Functional Materials*, North American Edition (The Manufacturing Confectioner Publishing Co., Glen Rock), which is incorporated herein by reference.

The appropriate hydrophilic-lipophilic balance (HLB) of surfactants is chosen to correspond to the HLB of the (meth)acrylic polymer containing at least one functional group having an active hydrogen (a) being emulsified. The method for selecting the optimum HLB for the polymer is well known to one skilled in the art and is described, for example, in "The HLB System" by ICI Americas Inc.

Because the emulsion of the (meth)acrylic polymer containing at least one functional group having an active hydrogen (a), as defined by components (a), (c) and (f), may be prepared prior to the addition of the epoxy silane oligomer composition (b), the emulsifiers can be chosen so that their HLB can be close to the HLB of the epoxy silane oligomer composition to also help stabilize the epoxy silane oligomer in the water-based coating composition.

The emulsifier (c) should be present in the amount of from about 0.5 weight percent to about 50 weight percent, more specifically from about 1.0 weight percent to about 15 weight percent, and even more specifically from about 2.0 weight percent to about 7 weight percent, based on the weight of the (meth)acrylic polymer containing at least one functional group having an active hydrogen (a).

Titanium Oxide Particles

Titanium dioxide, also known as titanium(IV) oxide or titania, is a naturally occurring oxide of titanium, chemical formula $TiO_2$. When used as a pigment, it is called titanium white, Pigment White 6 (PW6), or CI 77891. Generally, it is sourced from ilmenite, rutile and anatase. Titanium dioxide occurs in nature as the minerals rutile and anatase, and additionally as two high pressure forms. One of these is a monoclinic baddeleyite-like form known as akaogiite, and the other is an orthorhombic $\alpha$-$PbO_2$-like form known as brookite. Rutile contains about 98% titanium dioxide in the ore. The metastable anatase and brookite phases convert irreversibly to the equilibrium rutile phase upon heating above temperatures in the range 600-800° C.

Titanium dioxide has eight modifications—in addition to rutile, anatase, akaogiite, and brookite, three metastable phases can be produced synthetically (monoclinic, tetragonal and orthorhombic), and five high-pressure forms ($\alpha$-$PbO_2$-like, baddeleyite-like, cotunnite-like, orthorhombic OI, and cubic phases) also exist. The most common mineral source is ilmenite.

The rutile mineral sand can also be purified with the chloride process or other processes. Ilmenite is converted into pigment grade titanium dioxide via either the sulfate process or the chloride process. Both sulfate and chloride processes can produce the titanium dioxide pigment in the rutile crystal form. The chloride process converts ilmenite or other titanium sources to titanium tetrachloride via reaction with elemental chlorine, which is then purified by distillation, and reacted with oxygen to regenerate chlorine and produce the titanium dioxide. Titanium dioxide pigment can also be produced from higher titanium content feedstocks such as upgraded slag, rutile and leucoxene via a chloride acid process.

Titanium oxide particles can be in the form of a slurry, in which the slurry contains other components, including aluminum hydroxide, silica and water.

The titanium oxide particles can be classified using the method DIN EN ISO 591-1 (2000) Titanium dioxide pigments for paints—Part 1: Specifications and methods of test and ASTM D476 Standard Classification for Dry Pigmentary Titanium Dioxide Products. In one embodiment, the classification by type are:

|  | Type I | Type II | Type III | Type IV | Type V | Type VI | Type VII |
| --- | --- | --- | --- | --- | --- | --- | --- |
| Crystal structure | anatase | rutile | rutile | rutile | rutile | rutile | rutile |
| Typical application | White exterior house paint and interior uses | Low-medium percent PVC | High percent PVC | Exterior coating requiring high durability | Exterior coating requiring high durability with high gloss | Medium-high percent PVC | Low-high percent PVC |

|  | Type I | Type II | Type III | Type IV | Type V | Type VI | Type VII |
|---|---|---|---|---|---|---|---|
| Minimum TiO$_2$ content, % | 94 | 92 | 80 | 80 | 90 | 90 | 92 |
| Minimum moisture content, % | 0.7 | 0.7 | 1.5 | 1.5 | 1 | 0.7 | 0.7 |
| Specific gravity | 3.8-4.0 | 4.0-4.3 | 3.6-4.3 | 3.6-4.3 | 3.6-4.3 | 3.6-4.3 | 4.0-4.3 |

In one embodiment, the titanium oxide pigment is selected from Type I, Type IV and Type V.

The properties of pigments can be determined by ASTM D1208-96(2019) Standard Test Methods for Common Properties of Certain Pigments.

Titanium oxide particles (pigment) are available from Chemours, Cristal Global, Venator-Huntsman, Kronos and Tronox. Representative and non-limiting examples of titanium include Ti-Pure™ R-900, Ti-Pure™ R-960, Ti-Pure™ TS-6200, Ti-Pure™ TS-6300, Ti-Pure™ R-746, Ti-Pure™ R-706, Ti-Pure™ R-7411, and Ti-Pure™ R-902, commercially available from Chemours, Wilmington, Delaware.

The amount of titanium oxide particles used in the water-based coating composition is from about 0.5 weight percent to about 50 weight percent, more specifically from about 1.0 weight percent to about 25 weight percent, and even more specifically from about 5.0 weight percent to about 20.0 weight percent, the weight percent are based on the sum of the weights of the (meth)acrylic polymer containing at least one functional group having an active hydrogen (a) (dry weight), the epoxy silane oligomer composition (b), emulsifier (c), titanium oxide particles (d), a siliceous particulate filler (e), and water (f).

Siliceous Particulate Filler (e)

The siliceous particulate filler (e) is a mineral containing silicates. The siliceous particulate filler (e) can be selected from aluminum silicates, such as hydrous kaolin [Al$_2$Si$_2$O$_5$(OH)$_4$], mullite [Al$_2$SiO$_5$], pyrophyllite [Al$_2$Si$_4$O$_{10}$(OH)$_2$], kyanite [Al$_2$OSiO$_4$], nepheline syenite [sodium, potassium aluminum silicate], clay [hydrous aluminum phyllosilicates], and sillimanite [Al$_2$SiO$_5$]; silica [SiO$_2$], including fumed silica, precipitated silica, and ground quartz; talc [Mg$_3$Si$_4$O$_{10}$(OH)$_2$]; and the like.

The particle size distribution of the siliceous particulate fillers (e) can be determined by ASTM C1070-01 (2014) Standard Test Method for Determining Particle Size Distribution of Alumina or Quartz by Laser Light Scattering.

Representative and non-limiting examples of siliceous particulate fillers (e) include Minex® 10 nepheline syenite, commercial available from Sibelco, Kaoplate™ 13 from Thiele, Sandersville, Georgia and Attagel®50, commercially available from BASF in Florham Park, New Jersey.

The amount of siliceous particulate filler (e) in the water-based coating composition can be from about 0.05 to about 25 weight percent, more specifically from about 0.1 to about 15 weight percent, and even more specifically, from about 1 to about 5 percent, the weight percentages are based on the sum of the weights of the (meth)acrylic polymer containing at least one functional group having an active hydrogen (a) (dry weight), the epoxy silane oligomer composition (b), emulsifier (c), titanium oxide particles (d), a siliceous particulate filler (e), and water (f).

Water (f)

Water, including tap water, deionized water, or distilled water, is present in an amount so that the sum of the weights of the (meth)acrylic polymer containing at least one functional group having an active hydrogen (a) (dry weight), the epoxy silane oligomer composition (b), emulsifier (c), titanium oxide particles (d), a siliceous particulate filler (e) and water (f) add up to 100 percent, more specifically, from about 35 to about 90 weight percent, even more specifically from about 40 to about 80 weight percent, based on the sum of the weights of the (meth)acrylic polymer containing at least one functional group having an active hydrogen (a) (dry weight), the epoxy silane oligomer composition (b), emulsifier (c), titanium oxide particles (d), a siliceous particulate filler (e) and water (f).

Other Additives

The one or more additives are not particularly limited and can be chosen from any additive as may be suitable for a water-based coating composition and for a particular purpose or intended application. In embodiments, the composition can include one or more additives selected from the group consisting of adhesion promoters, dispersants, wetting agents, rheology modifiers, defoamers, thickeners, biocides, mildewcides, colorants, waxes, perfumes and co-solvents.

In addition to an epoxy silane oligomer produced in accordance with the present invention, the water-based coating composition may include a non-epoxy based monomeric silane such as a vinyl silane, an alkyl silane, or an alkylene silane. Typical non-epoxy based monomeric silanes may be vinyltrimethoxysilane, commercially available under the trade name Silquest® A-171 silane from Momentive Performance Materials, Inc. in Waterford, New York, vinyltriethoxysilane, commercially available under the trade name Silquest® A-151 silane from Momentive Performance Materials, Inc. in Waterford, New York, vinylmethyldimethoxysilane commercially available under the trade name Silquest® A-2171 silane from Momentive Performance Materials, Inc. in Waterford, New York, vinyltriisopropoxysilane commercially available under the trade name CoatOSil® A-1706 silane, from Momentive Performance Materials, Inc. in Waterford, New York, n-octyltriethoxy silane commercially available under the trade name Silquest® A-137 silane from Momentive Performance Materials, Inc. in Waterford, New York, propyltriethoxy silane commercially available under the trade name Silquest® A-138 silane from Momentive Performance Materials, Inc. in Waterford, New York, methyltrimethoxysilane, commercially available under the trade name Silquest® A-1630 silane from Momentive Performance Materials, Inc. in Waterford, New York, polyalkyleneoxidetrimethoxysilane, commercially available under the trade name Silquest® A-1230 silane from Momentive Performance Materials, Inc. in Waterford, New York, 3-methacryloxypropyltrimethoxy silane commercially available under the trade name Silquest® A-174 silane from Momentive Performance Materials, Inc. in Waterford, New York, or 3-methacryloxypropyltriisopropoxy silane, commercially available under the trade name CoatOSil® A-1757 silane from Momentive Performance Materials, Inc. in Waterford, New York.

In one embodiment, the water-based coating composition of any previous embodiment is a coating composition with a 60-degree gloss between 10 and 40 gloss units (GU); 15 and 35 gloss units; or 20 to 30 gloss units. Gloss can be evaluated using any suitable device and method to measure gloss. In one embodiment, gloss is measured using a BYK Micro-TRI-Gloss Meter, in accordance with ASTM D 523-14(2018) Standard Test Method for Specular Gloss.

The water-based coating composition of the present invention may be applied to any suitable substrate as desired for a particular purpose or intended application. In one embodiment, a process for coating a substrate comprises:

(a) providing a stock water-based coating composition comprising(meth)acrylic polymer containing at least one functional group having an active hydrogen (a), emulsifier (c), titanium oxide particles (d), siliceous particulate filler (e), water (1), and optional additives, (b) adding an epoxy silane oligomer to the stock water-based coating composition, and (c) applying the composition from (b) to a substrate and drying the composition to form a coating.

Drying as used herein means the removal of the water from the water based coating composition. Drying can include process such as the evaporation either at ambient conditions of temperature and pressure or at elevated temperatures or reduced pressures or both. It is understood that drying does not require complete removal of water and may include some residual amounts of water, including but not limited to less than about 10 weight percent, more preferably less than about 5 weight percent and even more preferably less than about 1 weight percent of water based on the sum of the weights of (meth)acrylic polymer containing at least one functional group having an active hydrogen (a), the epoxy silane oligomer composition (b), the emulsifier (c), titanium oxide particles (d), the siliceous particulate filler (e), and water (1).

In one embodiment, the water-based coating composition from (b) is applied to the substrate "as is," i.e., without further treating the coating prior to application to a substrate. In one embodiment, the water-based coating composition from (b) is heat aged prior to applying the composition to the substrate. Heat aging can be done at about 50° C. for 2 days, 5 days, 7 days 10 days, or 14 days. In one embodiment, the composition from (b) is heat aged for 14 days at 50° C. prior to applying the composition to a surface of a substrate.

Although not to be held to any particular theory, it is believed that the early water resistance is achieved by a rapid adsorption of the (meth)acrylic polymer having at least one functional group having an active hydrogen (a) onto the titanium dioxide particles (d) and the siliceous particulate filler (e), forming an interaction of component (a) with components (d) and (e) and where the epoxy silane oligomer composition (b) chemically reacts with these components to impart the early water resistance property.

The water-based coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The water-based coating composition of the invention can be applied to the materials by a variety of techniques well known in the art such as, for example, brush, rollers, mops, air-assisted or airless spray, electrostatic spray, and the like.

EXAMPLES

Example 1. Preparation of Epoxy Silane Oligomer Composition

A reactor equipped with an addition funnel, water condenser and mechanical agitation were charged with 100 parts of 3-glycidoxypropyltrimethoxysilane (Silquest® A-187 silane from Momentive Performance Materials, Inc.) and 35 parts of ion exchange resin (Amberlite® IRA 402 CL available from Sigma-Aldrich). Water was slowly and continuously introduced with stirring at atmospheric pressure and the temperature of about 70° C. The amount of water was 0.73 moles per mole of 3-glycidoxypropyltrimethoxysilane. After the addition was completed, the reaction mixture was stirred at the elevated temperature to complete the reaction. The methanol formed from the reaction was removed from the reactor under reduced pressure of about 0.2 bars. The reaction mixture was allowed to cool to room temperature. The reaction mixture was filtered to remove the ion exchange resin to yield about 80 parts of product.

Reverse phase high pressure liquid chromatography found 11.9 weight percent 3-glycidoxypropyltrimethoxysilane, 13.3 weight percent of 1,3-bis-(3-glycidoxypropyl)-1, 1,3,3-tetramethoxydisiloxane, 14.2 weight percent 1,3,5-tris-(3-glycidoxypropyl)-1,1,3,3,5,5-hexamethoxy-1,3,5-trisila-2,4-dioxapentane, and 60.6 weight percent of higher molecular weight poly-oligomers. The weight average molecular weight of the epoxy silane oligomer composition was 1300. The $^{29}$Si NMR analysis indicated silicon atoms having zero, one, two and three —OSi groups bonded to it of 11.9 mol percent, 41.3 mole percent, 37.3 mole percent and 9.5 mole percent, respectively.

Examples 2 and 3 and Comparative Examples A-C

Water-based coating compositions in accordance with aspects and/or embodiments of the invention were evaluated for early water resistance. An epoxy silane oligomer composition prepared in Example 1 was added to a commercial satin exterior paint and tested for early water resistance using the water immersion test and evaluated for blistering using ASTM D 714 (Standard Test Method for evaluating Degree of Blistering of Paints). The commercial satin exterior paint was purchased from Behr, trade name Premium Plus Ultra Exterior Satin Paint in Ultra Pure White No 9850. The composition of the commercial satin exterior paint contained 2-ethylhexyl benzoate, aluminum hydroxide, a polymer based on butyl acrylate and methyl methacrylate monomers containing less than 2 weight percent methacrylic acid, amorphous, precipitated silica and titanium dioxide pigment. The amount of the (met)acrylic polymer was about 27 weight percent, based on dry resin solids, and the amounts of silica and titanium oxide were used at levels greater than 1 and 10 weight percent, respectively.

Samples of the water-based coating compositions were prepared using epoxy lined one-quarter pint cans. Commercially available satin exterior paint (150 grams) was added to the can. An epoxy silane, 3-glycidoxypropyltrimethoxysilane (Silquest® A-187 available from Momentive Performance Materials Inc.) or the epoxy silane oligomer composition of Example 1, was subsequently post added to the satin exterior paint. A low shear paddle blade was used to incorporate the silane or the epoxy silane oligomer composition. Samples were allowed to stand for four hours before performing the drawdowns. Material was drawn down using a 5-mil bird bar over an alkyd cured black Leneta scrub chart. The alkyd cured black Leneta scrub chart containing the water-based coating composition was allowed to dry (cure) for various times at ambient temperature and ambient humidity.

Following a 24-hour cure time, the drawdowns were cut into three equal 2.5×6.5 inch coated strips. The first strip was immersed in room temperature deionized water for 24 hours. The second strip was left to cure an additional 3 days and immersed in room temperature deionized water for 24 hours. The final strip was left to cure an additional 6 days and immersed in room temperature deionized water for 24 hours. After the allowed cure and immersion time, panels were removed from the deionized water, softly patted dry using a paper towel, and rated for blistering using ASTM D 714.

Once the drawdowns were completed, the remainder of material in the one-quarter pint cans were enclosed using the appropriate lid and placed into a 50° C. oven for 2 weeks. After the samples had been in the 50° Celsius oven for 2 weeks, they were removed, and placed on a bench top for four hours to reach room temperature. The experiment described above was repeated on these aged water-based coating composition samples.

The compositions employed in the testing are provided in Table 1.

TABLE 1

| Example | Coating[1] | Monomeric Epoxy Silane[2] | Oligomeric Epoxy Silane[3] |
|---|---|---|---|
| Comparative Example A | 150 grams | — | — |
| Comparative Example B | 150 grams | 0.135 gram | — |
| Comparative Example C | 150 grams | 0.54 gram | — |
| Example 2 | 150 grams | — | 0.135 gram |
| Example 3 | 150 grams | — | 0.54 gram |

[1]Behr Premium Plus Ultra Exterior Satin Paint in Ultra Pure White No 9850
[2]Silauest ® A-187
[3]Epoxy silane oligomer composition from Example 1

ASTM D 714 Rating Overview

Under the ASTM D 714 testing method, blistering is evaluated in terms of size and frequency. Blister size is evaluated on a numerical scale of 10 to 0 where 10 represents no blistering 8 represents smallest blistering; 6, 4 and 2 represents progressively larger sizes. Blister frequency is evaluated in terms of the density of blisters within a given area and given a designation of D (Dense), MD (Medium Dense), M (Medium), or F (Few). In the present tests, the blister frequency is evaluated over the entire painted area of the coated strips, which is the entire paint area which is a 2-inch by 2.5-inch drawdown on a placard that is cut into 2.5×6.5 inches.

Tables 2 and 3 show results for the evaluation of blistering observed with the respective coatings. Table 2 shows the results for testing done on the "as made" coatings, i.e., the coatings applied to the substrates without any further treatment of the coating. Table 3 shows the results for the coatings that are heat aged as described in the experimental section.

TABLE 2

| As-Made Coatings | | | |
|---|---|---|---|
| Example | 1 Day | 4 Day | 7 Day |
| Comparative Example A | 2 MD | 4 F | 10 |
| Comparative Example B | 6 F | 10 | 10 |
| Comparative Example C | 6 M | 10 | 10 |
| Example 2 | 4 M | 6 F | 10 |
| Example 3 | 4 F | 4 F | 10 |

TABLE 3

| Heat Aged Coatings (2 weeks at 50° C.) | | | |
|---|---|---|---|
| Example | 1 Day | 4 Day | 7 Day |
| Comparative Example A | 6 D | 4 F | 10 |
| Comparative Example B | 4 F | 4 F | 10 |
| Comparative Example C | 4 F | 4 F | 10 |
| Example 2 | 4 M | 4 F | 10 |
| Example 3 | 6 F | 4 F | 10 |

Figure 2:
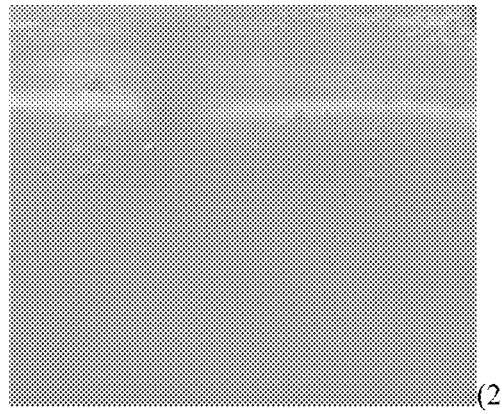
FIGS. 2a-2c are photographs of stock water-based coating composition containing 0.5 weight percent 3-glycidoxypropyltrimethoxysilane based on weight of (meth)acrylic polymer containing at least one functional group having an active hydrogen (Comparative Example B), which was coated onto substrates and dried for one day (2a), four days (2b) and 7 days (2c) after coating of the substrate and then submerged in water. Moderated blistering was observed after drying for one day, with low amounts of blistering observed after drying for 4 days.
Figure 2:
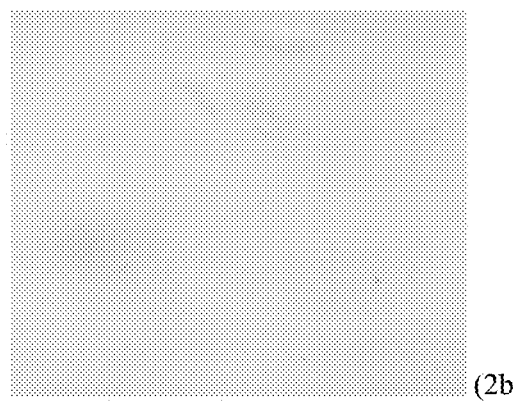
Figure 2:
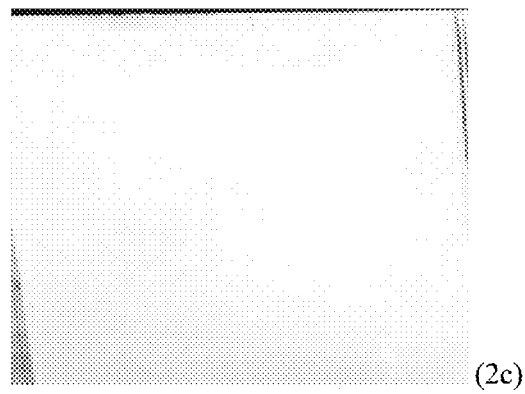
Figure 3:
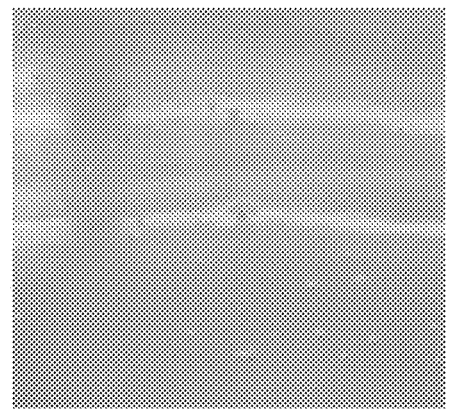
FIGS. 3a-3c are photographs of stock water-based coating composition containing 2.0 weight percent 3-glycidoxypropyltrimethoxysilane based on weight of (meth)acrylic polymer containing at least one functional group having an active hydrogen (Comparative Example C), which was coated onto substrates and dried for one day (3a), four days (3b) and 7 days (3c) after coating of the substrate and then submerged in water. Fish eyes were observed after drying for one day, with low amounts of blistering observed after drying for 4 days.
Figure 3:
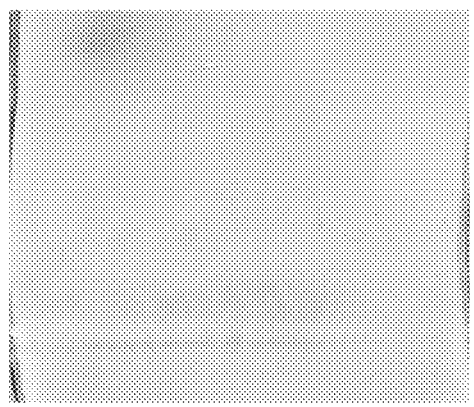
Figure 3:
Figure 4:
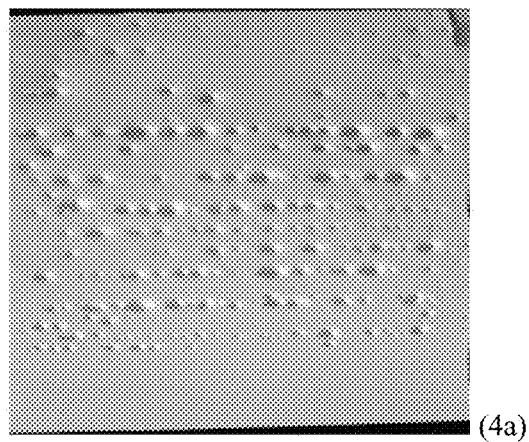
FIGS. 4a-4c are photographs of stock water-based coating composition containing 0.5 weight percent epoxy silane oligomer composition prepared in Example 1, based on weight of (meth)acrylic polymer containing a functional group having at least one functional group having an active hydrogen (Example 2), which was coated onto substrates and dried for one day (4a), four days (4b) and 7 days (4c) after coating of the substrate and then submerged in water. Blistering was observed after drying for one day, with very low amounts of blistering observed after drying for 4 days. Amount of about 0.5 weight percent of the epoxy silane oligomer composition are insufficient to achieve early water resistance.
Figure 4:
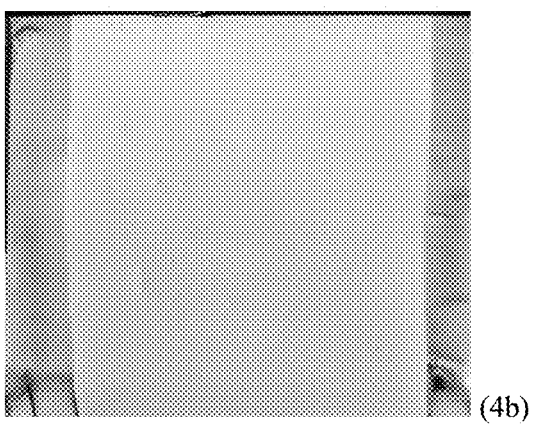
Figure 4:
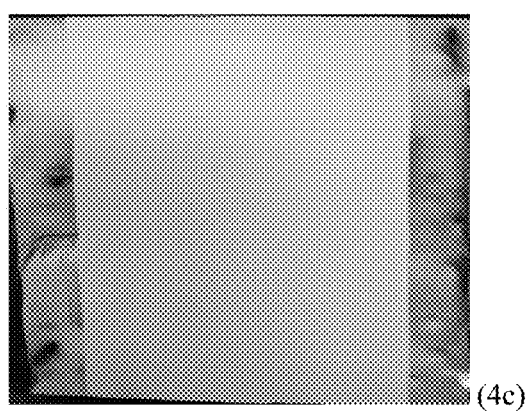
Figure 5:
FIGS. 5a-5c are photographs of stock water-based coating composition containing 2.0 weight percent epoxy silane oligomer composition prepared in Example 3, based on weight of (meth)acrylic polymer containing at least one functional group having an active hydrogen (Example 2), which was coated onto substrates and dried for one day (5a), four days (5b) and 7 days (5c) after coating of the substrate and then submerged in water. The coating appearance that was observed after drying for one day, 4 days and 7 days, lack significant blistering and did not have any fish eyes.
Figure 5:
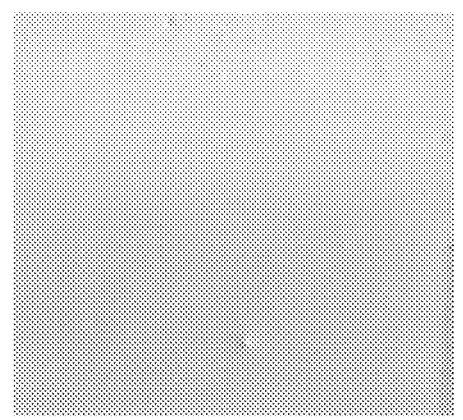
Figure 5:
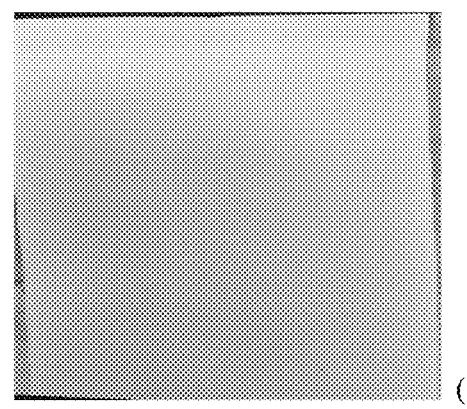

FIGS. 1 to 5 are photographs of the coating samples employing the heat aged coatings. Examples 2 and 3 exhibit better moisture resistance as evidenced by the reduced blistering evaluated at 1 day and at 4 days as compared to Comparative Example A, which does not contain an additional epoxy silane. Examples 2 and 3 are also better in performance than Comparative Examples B and C. Example 3 with the higher concentration of epoxy silane oligomer performs better than Comparative Example B and C using the monomeric epoxy silane. Example 2, while having a slightly higher density of blisters than Comparative Examples B and C, exhibits better performance in that the coatings of Comparative Examples B and C exhibit other defects such as pinholes that are not found in Examples 2 and 3.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a coating composition, and particularly a latex coating composition. Modifications may occur to those skilled in the art and to those who may make and use the invention. The disclosed embodiments are merely for illustrative purposes and not intended to limit the scope of the invention or the subject matter set forth in the claims.

What is claimed is:

1. A water-based coating composition comprising:
(a) a (meth)acrylic polymer containing at least one functional group having an active hydrogen;
(b) an epoxy silane oligomer composition containing
(i) a monomer in an amount of from 5 to 15 weight percent and having the structure of Formula (I):

$$(Z^c)_a(R^1O)_{3-2a}Si-R^2 \qquad (I)$$

(ii) a dimer in the amount of from 5 to 20 weight percent and having the structure of Formula (II):

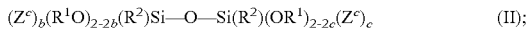 (II);

(iii) at least one trimer having a linear structure (III) or a cyclic structure (IV):

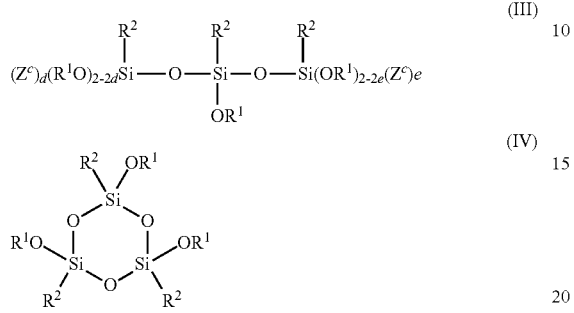

in the amount of from 5 to 20 weight percent, wherein the total amount of the trimer (iii) is the sum of the weights of linear trimer of Formula (III) and/or cyclic trimer of Formula (IV); and (iv) at least one poly-oligomer having the structure of Formula (V):

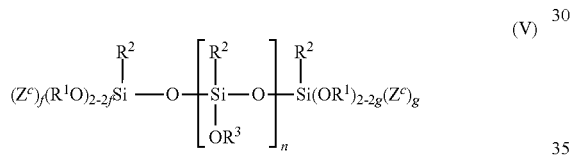

in the amount of from 45 to 85 weight percent, wherein the total amount of poly-oligomer (iv) is the sum of the weights of each component having a structure of Formula (V), wherein
each occurrence of $Z^c$ is independently a divalent group —$OR^4O$—, where $R^4$ is independently a divalent linear alkylene group of 2 to 6 carbon atoms or a branched alkylene group of 3 to 6 carbon atoms, with the provisos that
(i) the two oxygen atoms are bonded to two different carbon atoms in $R^4$ and
(ii) the open valence of each oxygen atom is bonded to the same Si atom to form a cyclic 1,3-dioxa-2-sila-cycloalkyl group;

each occurrence of $R^1$ is independently a monovalent linear alkyl group containing from 1 to 6 carbon atoms, a branched alkyl group containing from 3 to 6 carbon atoms or a —$OR^4OH$ group where $R^4$ is as above;

each occurrence of $R^2$ is

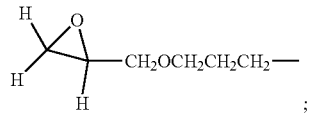

each occurrence of $R^3$ is independently a monovalent linear alkyl group containing from 1 to 6 carbon atoms, a branched alkyl group containing from 3 to 6 carbon atoms, a —$OR^4OH$ group where $R^4$ is as above, or

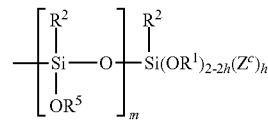

where each occurrence of $R^5$ is independently a monovalent linear alkyl group containing from 1 to 6 carbon atoms, a branched alkyl group containing from 3 to 6 carbon atoms, a —$OR^4OH$ group where $R^4$ is as above, or

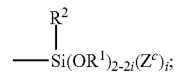

and the subscripts a, b, c, d, e, f, g, h, i, m and n are integers, where a, b, c, d, e, f, g, h and i are independently 0 or 1, m is 0 to 5 and n is 2 to 15, and wherein the weight percentages are based on the total weight of the sum of components (i), (ii), (iii) and (iv);

(c) an emulsifier;
(d) titanium oxide particles;
(e) a siliceous particulate filler; and
(f) water.

2. The water-based coating composition of claim 1, wherein the functional group containing an active hydrogen is a carboxyl group (—C(=O)OH) or a hydroxyl groups (—OH).

3. The water-based coating composition of claim 2, wherein the functional group containing an active hydrogen is a carboxyl group that is neutralized to the salt form —C(=O)O$^-$M$^+$, where M$^+$ is Na$^+$, K$^+$, or an ammonium ion.

4. The water-based coating composition of claim 2, wherein the carboxyl group is in an amount sufficient to have an acid number, as determined by potentiometric titration methods, of from about 1 to about 780.

5. The water-based coating composition of claim 1, wherein the (meth)acrylic polymers containing at least one functional group having an active hydrogen (a) is selected from the group consisting of pure acrylics, styrene acrylics, vinyl acrylics and acrylated ethylene vinyl acetate copolymers.

6. The water-based coating composition of claim 5, wherein the (meth)acrylic polymers containing at least one functional group having an active hydrogen (a) is prepared by emulsion polymerization.

7. The water-based coating composition of claim 6, wherein the pure acrylics are prepared using acrylic acid, methacrylic acid, an acrylate ester, and/or a methacrylate ester as the monomers, the styrene acrylics are prepared using styrene and acrylic acid, methacrylic acid, an acrylate ester, and/or a methacrylate ester as the monomers, the vinyl acrylics are prepared using vinyl acetate and acrylic acid, methacrylic acid, an acrylate ester, and/or a methacrylate ester as the monomers and the acrylated ethylene vinyl acetate copolymers are prepared using ethylene, vinyl acetate and acrylic acid, methacrylic acid, an acrylate ester, and/or a methacrylate ester as the monomers.

8. The water-based coating composition of claim 1, wherein the (meth)acrylic polymer containing at least one functional group having an active hydrogen (a) is in an amount of from about 5 to about 60% by weight, based on the sum of the weights of (meth)acrylic polymer containing at least one functional group having an active hydrogen (a), the epoxy silane oligomer composition (b), the emulsifier (c), titanium oxide particles (d), the siliceous particulate filler (e) and water (f).

9. The water-based coating composition of claim 1, wherein $R^1$ is selected from the group consisting of methyl, ethyl, propyl, isopropyl, 2-hydroxyethyl, 2-methyl-3-hydroxypropyl, 3-hydroxybutyl, and 1,3-dimethyl-3-hydroxybutyl; $R^3$ is selected from the group consisting of methyl, ethyl, propyl, isopropyl, 2-hydroxyethyl, 2-methyl-3-hydroxypropyl, 3-hydroxybutyl, and 1,3-dimethyl-3-hydroxybutyl; $R^4$ is selected from the group consisting of ethylene, propylene, and 2-methyl propylene; and $R^5$ is selected from the group consisting of methyl, ethyl, propyl, isopropyl, 2-hydroxyethyl, 2-methyl-3-hydroxypropyl, 3-hydroxybutyl and 1,3-dimethyl-3-hydroxybutyl; (glycidoxypropyl)bis(2-methyl-3-hydroxypropoxy)silyl, and [(glycidoxypropyl)dimethoxysilyloxy]-(glycidoxypropyl)methoxysilyl.

10. The water-based coating composition of claim 1, wherein $R^1$ is methyl or ethyl, $R^3$ is methyl or ethyl; $R^5$ is methyl, ethyl, (glycidoxypropyl)dimethoxysilyl; or (glycidoxypropyl)diethoxysilyl); and a, b, c, d, e, f, g, h, and i are 0.

11. The water-based coating composition of claim 1, wherein the epoxy silane oligomer composition (b) has a weight average molecular weight of from about 500 to about 2500.

12. The water-based coating composition of claim 1, wherein the epoxy silane oligomer composition (b) is an amount of from greater than 0.5 weight percent to about 5 weight percent, based on the weight of the (meth)acrylic polymer containing at least one functional group having an active hydrogen (a).

13. The water-based coating composition of claim 1, wherein the emulsifier (c) is a surfactant selected from the group consisting of polyoxyethylene alkyl ethers, polyoxyethylene alkyl phenyl ethers, polyoxyethylene fatty acid esters, sorbitan fatty acid esters, polyoxyethylene sorbitan fatty acids esters, fatty acid salts, alkyl sulfate ester salts, alkyl benzene sulfonate salts, alkyl phosphate salts, alkyl-allyl sulfate ester salts, polyoxyethylene alkylphophate ester salts, and quaternary ammonium salts.

14. The water-based coating composition of claim 1, wherein the emulsifier (c) is in an amount of from about 1.0 weight percent to about 15 weight percent, based on the weight of the (meth)acrylic polymer containing at least one functional group having an active hydrogen (a).

15. The water-based coating composition of claim 1, wherein the titanium oxide particles (d) are present in an amount of from about 0.5 weight percent to about 50 weight percent by weight based on the sum of the weights of the (meth)acrylic polymer containing at least one functional group having an active hydrogen (a), the epoxy silane oligomer composition (b), emulsifier (c), titanium oxide particles (d), a siliceous particulate filler (e), and water (f).

16. The water-based coating composition of claim 1, wherein the siliceous particulate filler (e) is selected from the group consisting of hydrous kaolin, mullite, pyrophyllite, kyanite, nepheline syenite, clay, sillimanite, silica, and talc.

17. The water-based coating composition of claim 1, wherein the siliceous particulate filler (e) is in the amount of from about 0.05 to about 25 weight percent by weight based on the sum of the weights of the (meth)acrylic polymer containing at least one functional group having an active hydrogen (a), the epoxy silane oligomer composition (b), emulsifier (c), titanium oxide particles (d), a siliceous particulate filler (e), and water (f).

18. A method of coating a substrate comprising applying the water-based coating composition of claim 1 to a surface of a substrate and drying the water-based coating composition to form a coating.

19. The method of coating a substrate of claim 18, wherein the water-based coating composition is heat aged at about 50° C. for 14 days prior to applying the water-based coating composition to the substrate.

20. The method of coating a substrate of claim 18, wherein the water-based coating composition after applying to the substrate and drying has a 60-degree gloss value between 10 and 40 gloss units (GU).

21. An article comprising a coating disposed on a surface of the article, where the coating is formed from the water-based coating composition of claim 1.

* * * * *